Feb. 2, 1932.  W. H. JACKSON ET AL  1,843,640
ELEVATED AIRPORT
Filed Jan. 15, 1929  2 Sheets-Sheet 1
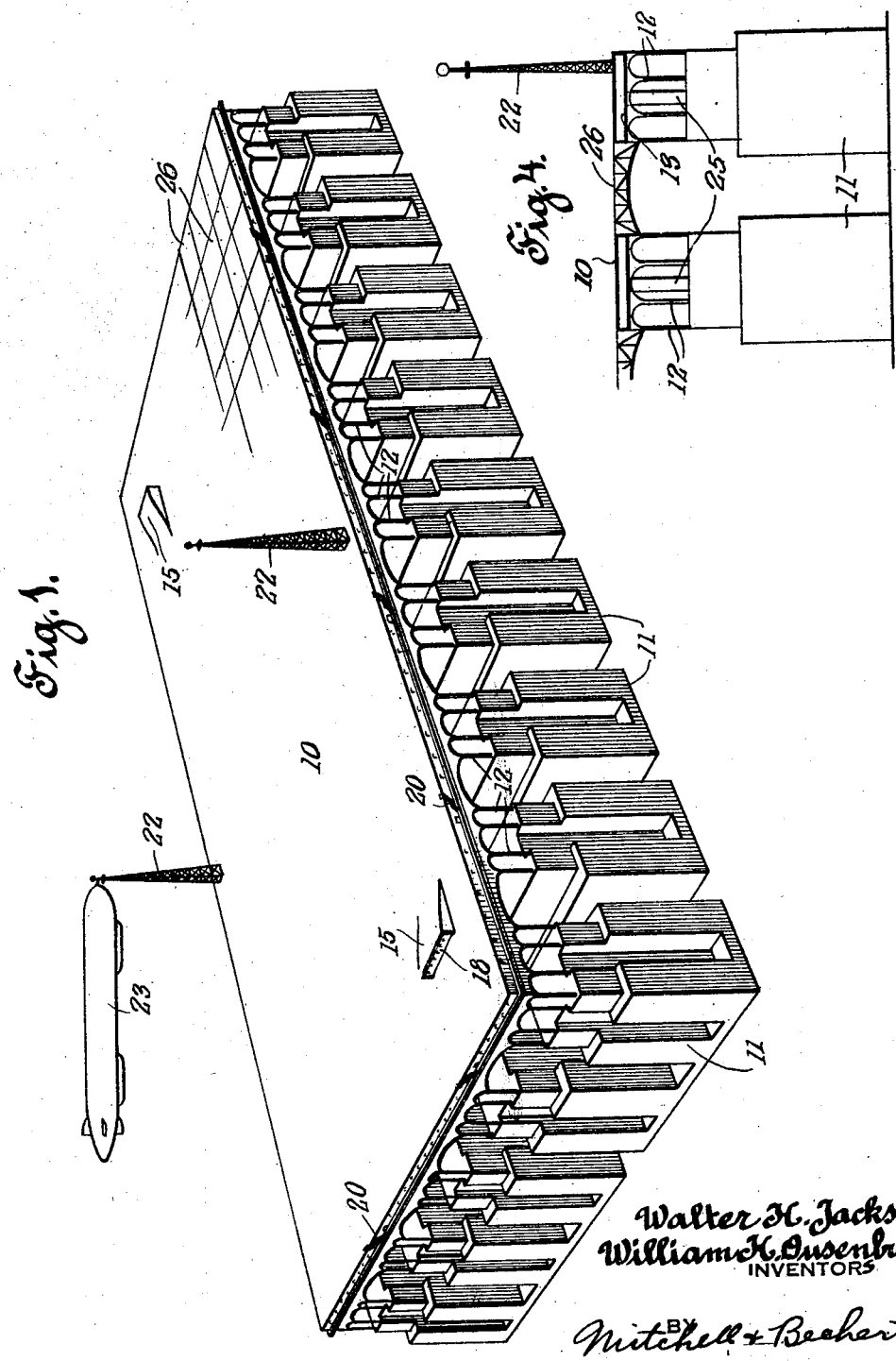
Walter H. Jackson
William H. Ousenbury
INVENTORS
BY Mitchell & Bechert
ATTORNEYS

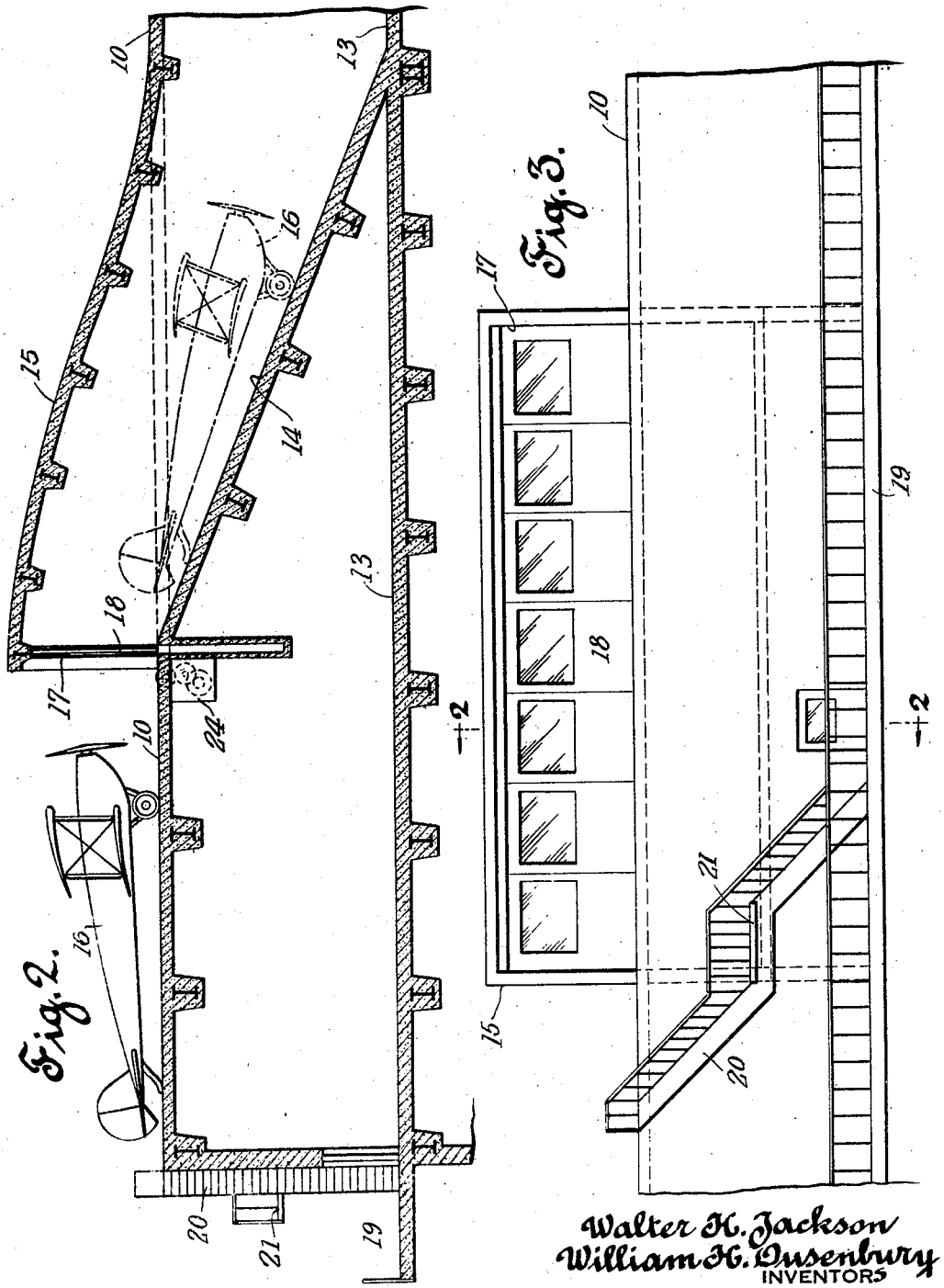

Patented Feb. 2, 1932

1,843,640

UNITED STATES PATENT OFFICE

WALTER H. JACKSON, OF SUMMIT, AND WILLIAM H. DUSENBURY, OF BOGOTA, NEW JERSEY

ELEVATED AIRPORT

Application filed January 15, 1929. Serial No. 332,685.

This invention relates to aircraft landing fields, and in particular to a field adapted for a congested and built up metropolitan area.

An object of the present invention is to provide an extensive area suitable for landing aircraft, elevated above the ground or street level, and supported by buildings directly below it so that the field may be positioned closely adjacent to lines of transportation and within the heart of a large city without taking up expensive ground areas.

Another object of the invention is to provide means for landing aircraft upon a substantially horizontal surface of extensive area and provide means for housing the aircraft in hangars adjacent the area and preferably in a manner which will not obstruct the surface for landing purposes.

A further object of the invention is to provide a landing field supported upon a plurality of buildings and spaced sufficiently thereabove so that hangar space may be provided co-extensively with portions of the field and directly below the landing area.

A further object of the invention is to provide mooring masts upon the elevated field fully equipped to moor an airship and land passengers, crew and supplies therefrom.

A further object of the invention is to provide means adjacent a portion of the landing surface and connected by a runway to the hangar space directly below the field so that aircraft can be readily transferred from the field to the hangar or vice versa.

A still further object of the invention is to provide a continuous road or passageway about the elevated platform below the plane of the landing field and connected at spaced points by stairways to the field.

With these and other objects in view our invention includes the features of construction and operation set forth in the following specification and illustrated in the accompanying drawings.

In the accompanying drawings annexed hereto and forming a part of this specification, we have shown our invention embodied in a preferred form of landing field superposed upon a plurality of high buildings, but it will be understood that the invention can be otherwise embodied and that the drawings are not to be construed as defining or limiting the scope of the invention, the claims appended to this specification being relied upon for that purpose.

In the drawings—

Fig. 1 is a perspective view of a preferred embodiment of a landing field shown superposed upon and supported by a plurality of buildings;

Fig. 2 is an enlarged view in section of a portion of the landing field showing the means for housing aircraft with relation to the landing field and for transferring planes between the field and hangar;

Fig. 3 is a view in elevation of a portion of the field showing the means for conveying aircraft between the field and the hangar; and Fig. 4 is a fragmentary view in elevation of the elevated field.

In the above mentioned drawings, we have shown but one embodiment of the invention which is now deemed preferable, but it is to be understood that changes and modifications may be made within the scope of the appended claims without departing from the spirit of the invention.

In the use of aircraft for passenger, mail and express services, it is highly desirable to provide means for starting and ending flights at points closely adjacent the congested area of the cities served by these aircraft. It is therefore a primary object of the invention to provide a suitable extensive landing field to accommodate a large number of planes of varying types and sizes and to facilitate landing and departing therefrom.

It is essential in the use of aircraft to provide ample space for taking off and for landing in a plurality of directions. It is therefore an object of the invention to have the field of ample dimensions in all directions. The field is elevated above surrounding buildings and located within built up areas closely convenient to present day transportation facilities. By being superposed upon a plurality of buildings the necessity of employing land exclusively for taking off and landing purposes is obviated. We support the landing field or area 10 upon the tops of a plurality of buildings 11 extending over an extensive area. The field is supported upon these buildings 11 by suitable columns 12 so that the landing field 10 may be disposed substantially horizontally at a sufficient distance above the buildings to interpose a hangar 13 and extend over a sufficiently wide area.

As shown in Fig. 4 the portions of the field directly over the streets may be supported by open truss work as shown at 26. The field surface over these portions is provided with transparent or translucent panes or parts to enable light to pass downward to the streets. The spaced columns 12 throughout the area support it upon the tops of the buildings 11. Within the space below the field 10 and above the buildings 11 supporting the field is a second surface 13 suitably spaced below the field 10 to serve as storage and hangar space for serving the field 10 preparatory to the aircraft taking off or to unload and reload these aircraft. For that purpose we provide a runway 14 leading from the field 10 at a portion of its periphery to the hangar space 13 directly below the field 10. Preferably near the periphery of the field are one or more inclined runways 14 which connect the field 10 and the hangar floor 13. The runways 14 are completely roofed over by the ramps 15, which are built sufficiently strong to sustain the weight of aircraft so as to diminish as little as possible the effective landing area of the field. Preferably two of these runways are provided positioned as shown in Fig. 1 adjacent diametrically opposite corners of the field 10. Sliding or hinged doors 18 may be provided at the top of the runways 14, and may be conveniently opened and closed by being lowered and raised by suitable mechanically operated means.

The aircraft 16 may be moved up or down the incline with the aid of a suitable winch or cable operated by power means 24 adjacent the upper end of the incline 14.

In order to further serve the field a roadway or pathway 19 may be provided extending completely about the periphery of the field at the elevation of the hangar space 13 oevr which may traverse trucks or other conveyances for serving the field 10. Stairways 20 extend from this way 19 to the field 10. An elevated pathway 21 above the roadway and below the plane of the field 10 provides an additional foot path.

Also at one or more parts of the field 10 may be provided mooring masts or towers 22 to which may be secured airships such as shown at 23. These towers 22 may be provided with suitable elevators for landing and loading these airships.

Access to the field 10 from the ground may be had through the usual elevators 25 serving the buildings suitably extended to the level of the hangar space 13. From the hangar space 13 access to the field may be had through the runways 14 or by the stairways 20.

We claim:

1. A landing field for aircraft comprising, a horizontal elevated surface of extensive area, a ramp, a runway beneath said ramp, and an elevated hangar below said surface, said runway leading into said hangar from said field.

2. A landing field for aircraft, comprising a horizontal elevated surface of extensive area, an elevated hangar below said surface, an inclined runway leading from said surface to said hangar, and a roof for said runway, said roof being sufficiently strong to support the weight of aircraft and forming a ramp having one end thereof substantially in the plane of said surface.

WALTER H. JACKSON.
WILLIAM H. DUSENBURY.